Patented June 26, 1945

2,379,246

UNITED STATES PATENT OFFICE 2,379,246

CORROSION RESISTANT COATING COMPOSITIONS

Irving E. Muskat, Akron, Ohio, assignor to Pittsburgh Plate Glass Company, Pittsburgh, Pa., a corporation of Pennsylvania No Drawing. Application April 1, 1942, Serial No. 437,284

12 Claims. (Cl. 220—64)

This invention relates to the shipment or storage of aqueous solutions of an alkali metal hydroxide. Sodium hydroxide solutions are very corrosive to metals and in consequence, it is very difficult to avoid corrosion and consequent metallic contamination when such solutions are stored or shipped in metallic containers. The problem is particularly acute when applied to the storage or shipment of solutions of 65 to 80 percent concentration in liquid state since temperatures above 150° F. must be utilized. Such concentrated caustic solutions are extremely corrosive at this temperature.

A further difficult problem arises in the use of dilute caustic soda solutions in various processes, such as in soap making, which require high temperatures. At such temperatures the metallic elements of the containers in which the processes are conducted are often attacked to such an extent that the resulting soaps become contaminated with metallic impurities.

In prior United States Letters Patents No. 2,111,342 and No. 2,162,027, the use of ethyl cellulose or similar cellulose ether has been described for this purpose. The coating compositions therein described have been found to be very effective and have achieved extensive commercial use. However, the chief disadvantage of such coatings arises from the fact that they possess low resistance to water, and in consequence, are often seriously deteriorated when the container is washed with water. Furthermore, the coatings are attacked by concentrated caustic at temperatures above 220° F., or by dilute (3 to 20 percent) caustic at somewhat lower temperatures.

In accordance with the present invention, it has been found that the heat and water resistance of cellulose ethers may be materially improved by incorporation of an organic compound which contains at least two polymerizable groups into the coating composition and polymerizing the compound. Of special interest are the compounds, preferably oxygen compounds, in which the unsaturated groups are unconjugated with respect to carbon such as esters of unsaturated acids, for example, acrylic, methacrylic, alpha ethyl acrylic, alpha chloracrylic, or other alpha alkyl or other alpha substituted acrylic acid, crotonic acid, or cinnamic acid, and unsaturated alcohols, preferably containing no more than ten carbon atoms such as the allyl, methallyl, crotyl, 2-ethylallyl, 2-chlorallyl, methylvinyl carbinyl, butadienyl, propargyl, methyl propargyl, phenyl propargyl, linallyl, or cinnamyl alcohols, and also the corresponding vinyl esters.

Moreover, the invention may be applied to the polyesters of polybasic acids such as succinic, tartaric, citric, malonic, maleic, fumaric, adipic, phthalic, sulphuric, phosphoric, acids, etc., and the above unsaturated alcohols. For example, compounds such as diallyl phthalate, diallyl carbonate, dimethallyl adipate, vinyl allyl phthalate, ethyl allyl maleate, etc., may be used.

Preferably, it is desirable to use a polyester of a polyhydric alcohol such as glycol, glycerol, diethylene glycol, propylene glycol, dipropylene glycol, triethylene glycol, methyl glycerol, phthalyl alcohol, resorcinol, etc., and acrylic, methacrylic, or similar alpha substituted acrylic acid such as glycol dimethacrylate, etc. However, the corresponding esters of other unsaturated acids mentioned above also may be used in order to improve the product.

Moreover, the other compounds mentioned in an application of Maxwell A. Pollack, Irving E. Muskat and Franklin Strain, Serial No. 421,222, filed December 1, 1941, and now abandoned, including the polyesters of (a) a polyhydric alcohol such as ethylene glycol, diethylene glycol, propylene glycol, glycerol, resorcinol, phthalyl alcohol, etc., and (b) an acid ester of an unsaturated alcohol and a polybasic acid such as sulphuric, silicic, or carbonic acid or similar complex esters of unsaturated alcohols and polycarboxylic acids containing from one to six ester linkages between a pair of acid groups as described in an application of Irving E. Muskat and Franklin Strain, Serial No. 403,703, filed July 23, 1941, may be used.

Generally, compounds of the above type having a boiling point above 150° C. are utilized, since otherwise, they may be largely vaporized with the solvent and in such a case no polymer will be formed in the cellulose ether. However, compounds of lower boiling point may be partially polymerized to a syrup or to a soluble fusible polymer such as is described in United States Patent No. 2,273,891, filed February 18, 1939, and granted February 24, 1942, to Maxwell A. Pollack, Irving E. Muskat, and Franklin Strain, and such polymer may be incorporated in the coating composition and further polymerized.

The compound may be intermixed with the cellulose ether coating composition, preferably in monomeric form. Generally, this monomer is substantially free from the polymer thereof, and at least five percent of the compound, based upon the weight of the cellulose ether is used. Optimum results are secured by the use of from 5 to 40 percent of the polyunsaturated compound, although some improvement in the cellulose ether is obtained when more of the polyunsaturated comhowever, difficulty is encountered in drying the films produced. This difficulty may be avoided by incorporation of the soluble fusible polymer previously mentioned.

The invention is particularly applicable to the use of these agents for improvement of ethyl cellulose. However, other cellulose ethers such as methyl, benzyl, or phenyl cellulose may be improved in like manner.

The coating composition may be dissolved or dispersed in various solvents or dispersing media such as benzene, xylene, toluene, ethyl or butyl acetate, cyclohexanone, water, etc., and applied to the metal surface by spraying or brushing. Plasticizers such as alkyl naphthalene, for example, mono-, di-, or other polyamyl, -methyl, -ethyl, or -butyl, or benzyl naphthalene, or chlorinated diphenyl, etc., may be incorporated into the mixture in order to promote the flexibility of the coating. Approximately 10 to 50 percent plasticizer, based upon the weight of the ethyl cellulose, may be used.

Peroxides such as benzoyl peroxide, lauroyl peroxide, acetone peroxide, etc., are preferably incorporated to assist polymerization of the coated base.

The following are examples of a suitable composition for use in the present invention:

*Example I*

| | Parts by weight |
|---|---|
| Toluene | 420 |
| Xylene | 210 |
| Ethanol | 200 |
| Ethyl cellulose | 80 |
| Methyl cellosolve acetate | 30 |
| Titanium dioxide | 30 |
| Diamyl naphthalene | 10 |
| Glycol dimethacrylate | 12.5 |
| Benzoyl peroxide | 0.6 |

*Example II*

| | Parts by weight |
|---|---|
| Toluene | 420 |
| Xylene | 210 |
| Ethanol | 200 |
| Ethyl cellulose | 80 |
| Methyl cellosolve acetate | 30 |
| Titanium dioxide | 30 |
| Diamyl naphthalene | 10 |
| Ethylene glycol bis (allyl carbonate) | 25 |
| Benzoyl peroxide | 1.2 |

*Example III*

| | Parts by weight |
|---|---|
| Toluene | 420 |
| Xylene | 210 |
| Ethanol | 200 |
| Ethyl cellulose | 80 |
| Methyl cellosolve acetate | 30 |
| Titanium dioxide | 30 |
| Diamyl naphthalene | 10 |
| Diallyl carbonate | 20 |
| Benzoyl peroxide | 1.2 |

*Example IV*

| | Parts by weight |
|---|---|
| Toluene | 420 |
| Xylene | 210 |
| Ethanol | 200 |
| Ethyl cellulose | 80 |
| Methyl cellosolve acetate | 30 |
| Titanium dioxide | 30 |
| Diamyl naphthalene | 10 |
| Allyl vinyl succinate | 15 |
| Benzoyl peroxide | 1.2 |

The coatings after application are allowed to dry and are thereafter treated to polymerize the compound. This may be done by use of heat and/or light. In order to secure a product of maximum heat stability and caustic and water resistance, it is often desirable to cure these coatings substantially in the absence of air and at a suitable temperature. This temperature is dependent to a large degree upon the decomposition temperature of the peroxide used. When benzoyl peroxide is utilized, a temperature of 60 to 120° C. is suitable. Somewhat higher temperatures may be used when a ketone peroxide such as acetone peroxide is utilized. In most cases this polymerization is effected by curing the coatings by heating them in contact with an aqueous solution of alkali metal hydroxide of about 40 to 75 percent concentration. The curing may also be effected by heating the coatings in contact with other high boiling liquids which do not attack the paint or in the presence of gases such as carbon dioxide, nitrogen, etc.

The time of polymerization is dependent upon the nature of the unsaturated compound used and in most cases heating at 60 to 100° C. for 36 hours is sufficient.

Pigments such as mica or titanium dioxide may be incorporated, if desired, in order to improve the resistance of the coating, or to give the desired color.

The films so produced are found to be very resistant to the attack of caustic, heat, and water in their finally cured state. Using tank cars coated with this material it is possible to ship or store caustic containing less than 0.001 percent of iron or other metallic impurity on the anhydrous basis without increase in the metal content of the solution over this value. In many cases, 73 percent caustic solutions containing 0.0001 to 0.0003 percent iron have been stored for long periods of time in coated iron tanks without material increase in iron content. Moreover, many of these compositions when cured will withstand the attack of boiling 3 percent caustic for many days.

Although the present invention has been described with reference to the specific details of certain embodiments thereof, it is not intended that such details shall be regarded as limitations upon the scope of the invention, except insofar as included in the accompanying claims. This application is a continuation-in-part of my copending application Serial No. 374,602, filed January 15, 1941, and now matured into Patent No. 2,354,824.

I claim:

1. An article of manufacture comprising a metallic container, the interior surface of which is coated with a composition comprising an alkali insoluble cellulose ether and an ester containing two unsaturated groups in which the unsaturation is in an aliphatic straight carbon chain and is attached to the second carbon atom from a carbonyl group.

2. An article of manufacture comprising a metallic container, the interior surface of which is coated with a composition comprising an alkali insoluble cellulose ether and an ester of a dibasic acid and a monohydric alcohol having an unsaturated linkage which is in a straight carbon chain and is attached to the second carbon from the hydroxyl group.

3. The article of manufacture of claim 2 in which the ester is a carbonate.

4. The article of manufacture of claim 2 in which the ester is diethylene glycol bis (allyl carbonate).

5. The article of claim 2 in which the cellulose ether is ethyl cellulose.

6. The method of preventing the dissolution of the metallic container walls by the caustic alkali content which comprises coating the surface with an organic liquid solution of a cellulose ether, a peroxy polymerization catalyst, and an ester containing two unsaturated groups in which the unsaturation is in an aliphatic straight carbon chain and is attached to the second carbon atom from a carbonyl group, evaporating the organic solvent, and heating to polymerize the polyunsaturated ester.

7. The method of claim 6 in which the ester is diethylene glycol bis (allyl carbonate).

8. The method of claim 6 in which the cellulose ether is ethyl cellulose.

9. An article of manufacture comprising a metallic container, the interior of which is coated with a composition comprising an alkali insoluble cellulose ether and an ester of a glycol and two molecular equivalents of a monocarboxylic acid having an olefinic bond attached to a beta carbon atom.

10. The method of preventing the dissolution of the metallic container walls by the caustic alkali content thereof, which comprises coating the surface with an organic liquid solution of a cellulose ether, a peroxy polymerization catalyst, and an ester of a glycol and two molecular equivalents of a monocarboxylic acid having an olefinic bond attached to a beta carbon atom, evaporating the organic solvent and heating to polymerize the glycol ester.

11. The article of manufacture defined in claim 9 wherein the ester is glycol dimethacrylate.

12. The method of claim 10 wherein the ester is glycol dimethacrylate.

IRVING E. MUSKAT.